United States Patent [19]

Van Den Nieuwelaar et al.

[11] Patent Number: 4,972,549
[45] Date of Patent: Nov. 27, 1990

[54] PROCESS FOR WEIGHING POULTRY, AND CONVEYOR HOOK FOR CARRYING OUT THIS PROCESS

[75] Inventors: Adrianus J. Van Den Nieuwelaar, Gemert; Petrus C. H. Janssen, Wilbertoord, both of Netherlands

[73] Assignee: Stork PMT B. V., Netherlands

[21] Appl. No.: 341,721

[22] Filed: Apr. 21, 1989

[30] Foreign Application Priority Data

Apr. 25, 1988 [NL] Netherlands .................... 8801069

[51] Int. Cl.$^5$ .............................................. A22B 1/00
[52] U.S. Cl. ..................................... 472/178; 482/179
[58] Field of Search ................. 17/44.1, 11, 24, 44.2, 17/44.3

[56] References Cited

U.S. PATENT DOCUMENTS

| | | | |
|---|---|---|---|
| 3,684,078 | 8/1972 | Nielsen | 17/44.1 |
| 3,686,712 | 8/1972 | Lewis | 17/44.1 |
| 4,228,635 | 10/1980 | Altenpohl et al. | 17/44.1 |
| 4,282,633 | 8/1981 | Graham et al. | 17/45 |
| 4,412,620 | 11/1983 | Altenpohl et al. | 17/44.1 |
| 4,524,488 | 6/1985 | Van den Bogert | 17/44.1 |
| 4,627,007 | 12/1986 | Muschany | 17/45 |

FOREIGN PATENT DOCUMENTS

| | | |
|---|---|---|
| 0084918 | 8/1983 | European Pat. Off. . |
| 0086700 | 8/1983 | European Pat. Off. . |
| 2828711 | 4/1979 | Fed. Rep. of Germany . |
| 2484087 | 11/1981 | France . |
| 6511938 | 3/1967 | Netherlands . |
| 7406087 | 11/1975 | Netherlands . |
| 8606587 | 11/1986 | PCT Int'l Appl. . |

*Primary Examiner*—Willis Little
*Attorney, Agent, or Firm*—Ostrolenk, Faber, Gerb & Soffen

[57] ABSTRACT

Process for weighing poultry which is conveyed suspended by the legs from suspension hooks directed in the direction of conveyance through a conveyor suspension track past a weighing station, prior to reaching the weighing position each of the hooks is turned through such an angle that during the weighing no contact between the birds, which would adversely affect weighing, occurs with conveyor hook especially suited for carrying out this process.

9 Claims, 5 Drawing Sheets

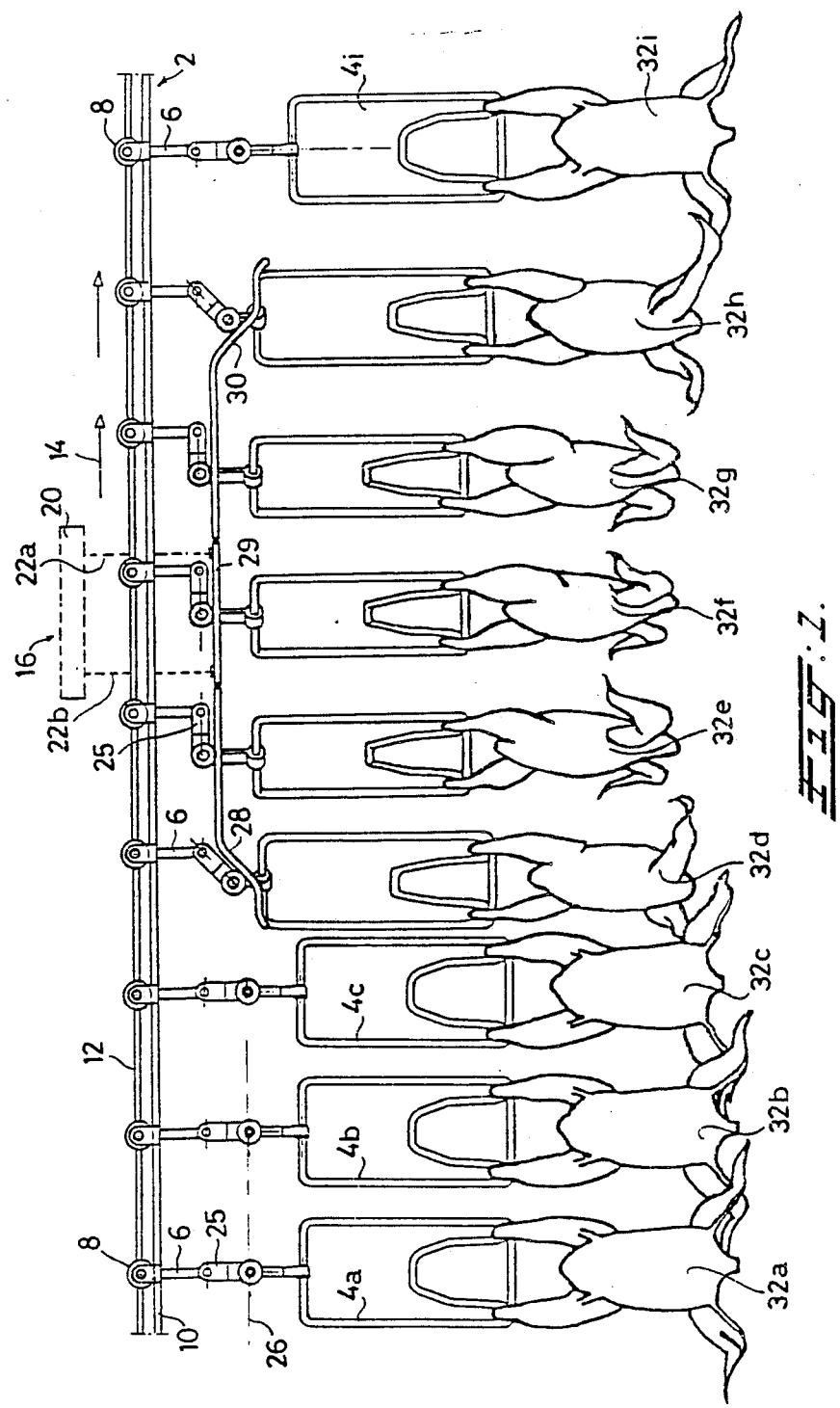

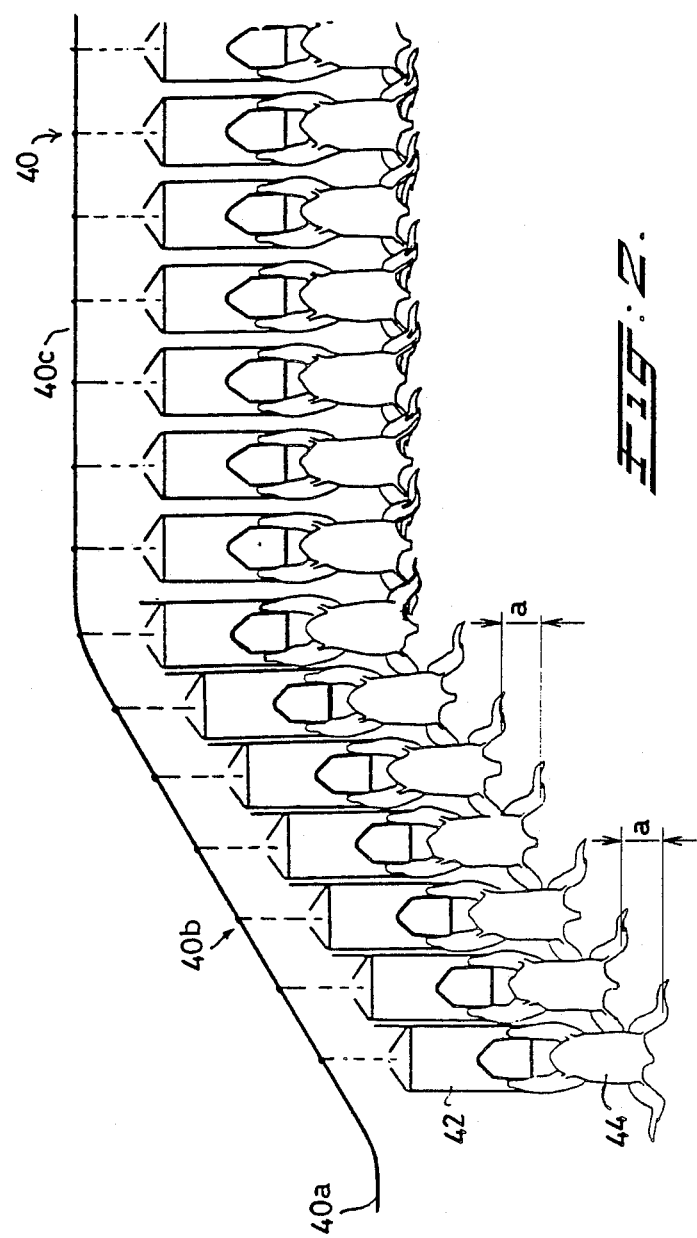

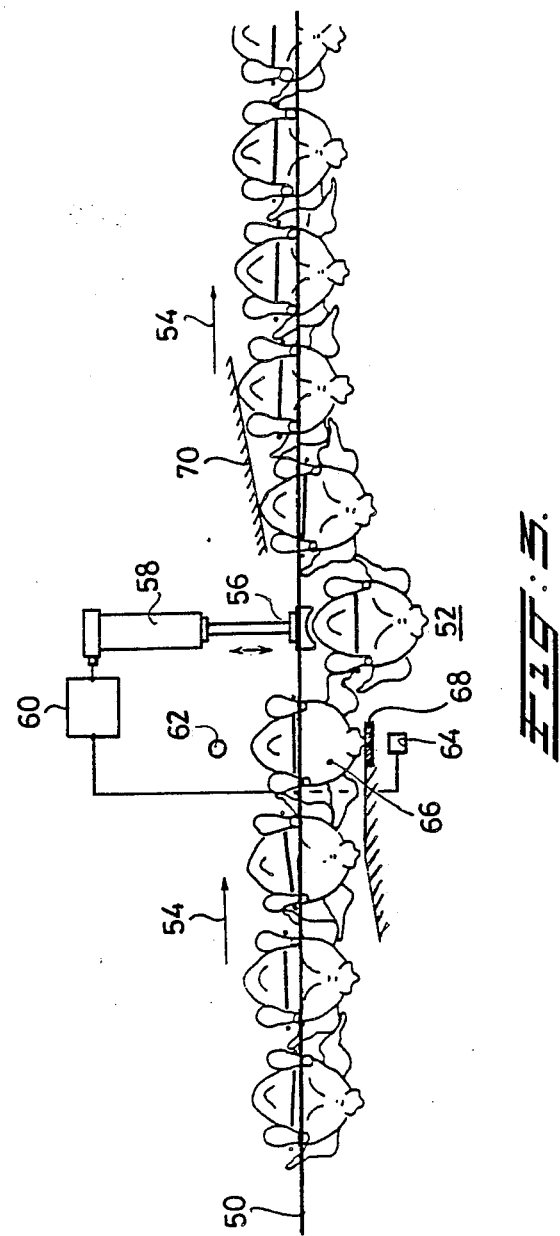

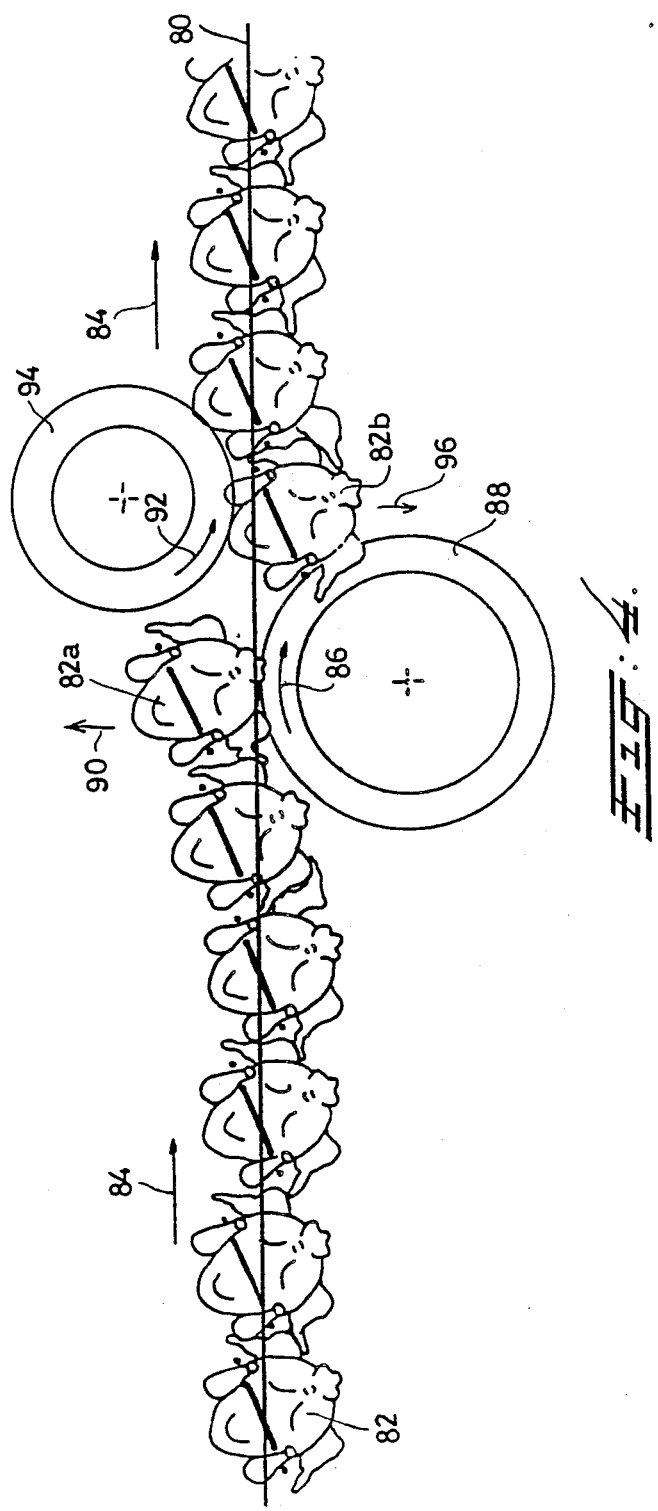

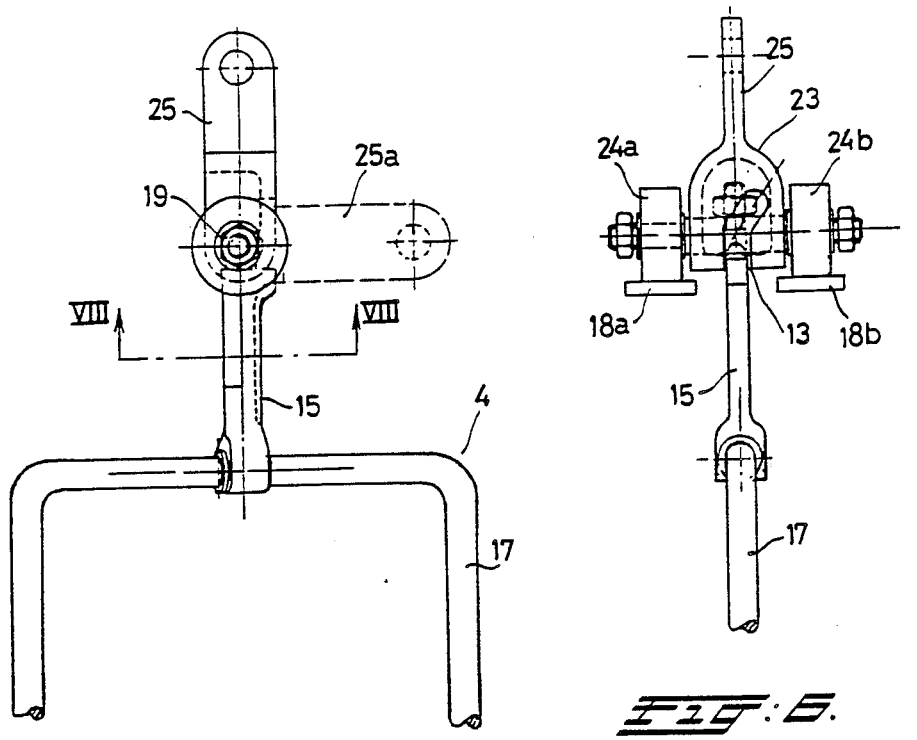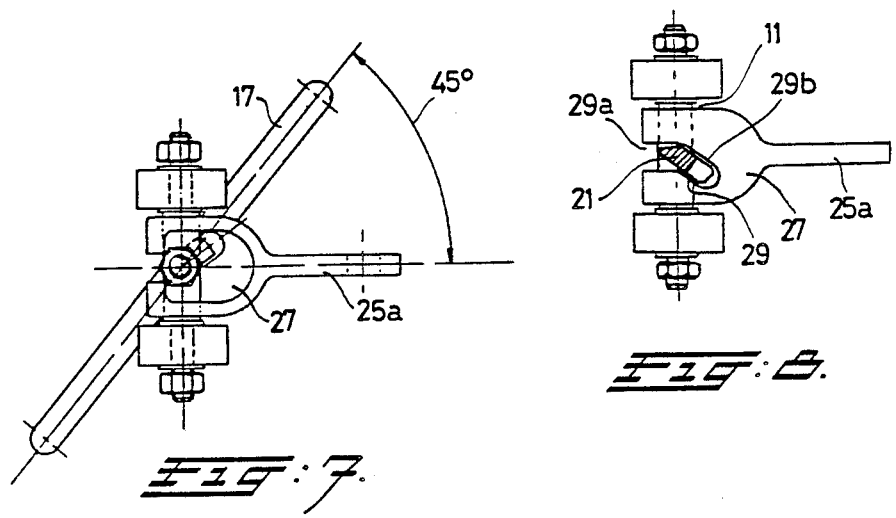

PROCESS FOR WEIGHING POULTRY, AND CONVEYOR HOOK FOR CARRYING OUT THIS PROCESS

BACKGROUND OF THE INVENTION

The invention relates to a process for weighing poultry which is conveyed suspended by the legs from suspension hooks directed in the direction of conveyance through a conveyor suspension track past a weighing station, characterized in that prior to reaching the weighing position each of the hooks is turned through such an angle that during the weighing no contact between the birds, which would adversely affect weighing, occurs. The invention also relates to a conveyor hook for carrying out this process.

DESCRIPTION OF THE PRIOR ART

Poultry which is conveyed suspended in the suspension hook of a conveyor belt past different processing stations has to be weighed at various stages of the processing, i.e. between various processing stations. This is not only because the weight of the product in the poultry slaughter business is an important factor for the correct setting of the various processing machines, but also because the weight is an important means of checking the various operations carried out, both as regards the effective removal of parts not fit for consumption and as regards monitoring of the efficiency in operations such as cooling, jointing, boning, etc.

Weighing of poultry advanced on such a conveyor belt does, however, in practice give rise to problems. In order to achieve the greatest possible capacity of conveyor belt and slaughter and processing plant, the birds on the conveyor belt have the smallest possible distance between them, with the result that the birds are constantly touching each other, in particular by the wings. Regardless of the weighing method used, this means that the weight determined is often not correct, because this contact between the birds interferes with the weighing result.

This is seen particularly when the weighing is carried out in the manner known from NL-A-No. 6511938, in which the hooks with the birds suspended from them are raised one by one in the weighing station, so that they are relieved of the pulling forces and resistances exerted by the conveyor belt.

An obvious solution to eliminate this problem is to increase the distance between the individual birds, but this, of course, proportionately reduces the capacity of the slaughter and processing plant. If an attempt is made to compensate this decrease in capacity by increasing the speed of the conveyor belt, other serious problems are encountered.

The object of the invention is to produce a process which is simple to carry out and a conveyor hook for carrying out this process, which can be used simply and cheaply in existing plants while retaining the small distance between birds, and with which it is possible for the birds to hang entirely free of each other during weighing, without changing the conveyor belt.

This object is achieved according to the invention in that prior to reaching the weighing position each of the hooks is turned through such an angle that during the weighing no contact between the birds, which would adversely affect the weighing result, occurs.

With this simple measure, which can easily be achieved in existing plants, weighing can be carried out accurately without any problems at all. This means that it is also more attractive to fit weighing stations at several points along the conveyor belt, with all the advantages thereof.

If the poultry carcasses are suspended in a regular and correct manner from the conveyor belt, the turning of the hooks, with the separation from each other of the wings thereby envisaged, will not give rise to problems, but in practice it is sometimes found that the carcasses are already suspended from the hooks in such an irregular way that the wings of adjacent birds are already caught in each other, so that when the hooks are subsequently turned problems still arise.

Various methods by which entangled wings of adjacent birds can be released from each other are possible. Prior to weighing the hooks can, while turning them, be displaced relative to each other in the vertical direction. The birds can be conveyed along a track stretch an angle with the horizontal, while it is also possible that, prior to or following the turning of the hooks, the birds are displaced relative to each other in a direction at right angles to the direction of conveyance. It must be pointed out here that this releasing operation has to be carried out only once, following which the birds can be turned out of the plane of the belt any desired number of times.

A conveyor hook for carrying out the process according to the invention comprises a suspension part for accommodating the legs of a bird, a coupling part to be coupled to the conveyor suspension track and supporting element(s) cooperating with at least one supporting platform of a weighing device for taking the weight of the suspension part and the bird hanging from it during the weighing, the suspension part being connected to a supporting rod which is guided in an aperture formed in the center of a shaft and at right angles to the axis thereof, said shaft carrying at each of its ends a supporting roller, and being rotatably accommodated in the, forked, carrier which has a guide track which is parallel to the shaft and has an end part crossing the shaft at an acute angle, cooperating with a boss projecting at right angles from the carrier rod, in such a way that turning of the carrier around the shaft brings about a controlled angular displacement of the carrier rod around the axis thereof.

Preferably the guide track is formed in a plate interconnecting the legs of the forked carrier.

Preferably the conveyor suspension track includes an angle with the horizontal on a track part preceding a weighing station and is designed so that it is ascending along that stretch.

Preferably there are means for turning the hooks while the track part is being covered, preferably a controlled ram which can be moved at right angles to the direction of conveyance and acts on the successive birds, or a first and a second guide wheel which are displaced relative to each other in the direction of conveyance and which can each be driven so that they rotate in the direction of conveyance, and which each extend with the outer periphery to below the path for the poultry.

DESCRIPTION OF THE DRAWINGS

FIG. 1 is a side view of a part of a conveyor suspension track for poultry, in which a weighing station is incorporated and the measures according to the invention are used;

FIG. 2 is a schematic representation of a part of a conveyor suspension track with suspension hooks and poultry suspended therefrom which are freed from each other prior to turning;

FIG. 3 is a top view of a second embodiment according to the invention for freeing the birds from each other;

FIG. 4 is a top view of a third embodiment for freeing the birds from each other;

FIG. 5 is a side view of a part of a conveyor hook preferably used according to the invention;

FIG. 6 is an end view thereof;

FIG. 7 is a top view thereof; and

FIG. 8 is a view in the direction of the arrows VIII—VIII in FIG. 5.

DESCRIPTION OF PREFERRED EMBODIMENTS

In FIG. 1 reference numeral 2 shows a conveyor suspension track, known per se, on which poultry is moved along suspended from conveyor hooks, a number of which are shown and indicated by 4a-4i. Each hook hangs from a bearing rod 6 having at the end a bearing roller 8 resting on a guide 10; the rollers are connected to each other by means of the cable 12, and the direction of movement of the whole unit is indicated by the arrow 14.

Along the conveyor track 2 is a weighing station 16, known per se, and comprising a platform 18 which is carried by a device 20, known per se, for determining the weight acting upon the platform; the connection thereto is symbolized by the dotted lines 22a, 22b. As is known, when the weighing station 16 is reached the weight of the hook and the bird suspended from it is no longer borne by the conveyor track 2, but by the platform 18, which in fact is made up of two parts 18a, 18b coupled together (see FIG. 6). For this, each hook is provided with two supporting elements, such as supporting rollers 24a, 24b (see FIGS. 5 to 7) and the platform 18 lies above the normal level of the supporting rollers indicated by the dotted line 26 in FIG. 1; a run-on part 28 is provided before the platform 18, to take the hook to the higher level.

Following the platform 18 there is a corresponding run-off part 30. When they reach the weighing station 16 the hooks are thus raised, and each hook then rests only with the supporting rollers 24a, 24b first on the run-on part 28, then on the weighing platform, and subsequently on the run-off part 30, and during weighing the hook with the bird suspended therefrom is free from interfering influences (shocks, impacts) which could be exerted by the conveyor track 2. This technique is known per se, for example from NL-A-No. 6511938.

It is clear that, for the sake of the greatest possible capacity of the conveyor track, the distance between the suspension hooks will be kept as short as possible, which is no problem for the operations to be carried out normally on the birds. It does mean, however, that the birds are constantly in contact with each other, with the result that during weighing wrong results are obtained through their interaction.

The invention is based on the idea that this interaction can be eliminated by ensuring that during weighing the hooks are turned through a specific angle, for example 45 degrees, relative to each other, with the result that the wings of adjacent birds, projecting sideways from the body, are completely released from each other, and interfering effects are thus ruled out.

The figure shows how the hooks 4a to 4c with the birds 32a to 32c suspended therefrom still remain in the normal position in which the wings of adjacent birds are in contact with each other. The hooks 4e to 4g are, however, turned through 45 degrees relative to the vertical, of course with the birds 32e to 43g suspended therefrom, the result being that the wings of these birds will no longer touch each other, so that during the weighing of a bird—in FIG. 1 this is thus the bird 32f—it is completely free from the interfering influence of adjacent birds. The hook 4i with the bird 32g suspended therefore is again in the normal position. The hooks 4d and 4h are in a transitional position.

An essential feature of the invention is thus that during the weighing the hook from which the bird to be weighed is suspended is turned through a specific angle relative to the normal direction; as the figure shows, the two adjacent hooks may also be turned through a specific angle (which need not be equal to the maximum turning angle). This turning can, of course, be achieved in various ways, and a preferred embodiment of a simple structure with which this turning is achieved will now be described below, but another problem connected with the process and device proposed according to the invention will be discussed first. The invention offers various methods of eliminating this problem.

FIG. 2 shows schematically a conveyor suspension track 40 with its suspension hooks 42 and the birds 44 hanging thereon. As the figure shows, this conveyor track comprises a part 40a at a certain level, a rising part 40b, and then a horizontal part 40c. In the rising part 40b the birds are moved over a certain distance 'a' in the vertical direction relative to each other, the wings, of course, also undergoing such a displacement; if the wings of birds brought in by the part 40a are entangled, these wings will be released from each other in the track part 40b. There are preferably provisions—not shown in the figure—for turning the hooks through a particular angle; their design will, of course, depend on the design of the hooks.

FIG. 3 shows a schematically indicated conveyor suspension track 50 from which each of the birds is moved to a particular position, indicated by 52, in the direction at right angles to the direction of conveyance indicated by the arrow 54. This is carried out by a ram 56 driven by a pneumatic cylinder 58 which works in combination with a control device 60 which is not described in greater detail. This control device 60 is controlled by a position detector comprising, for example, a light source 62 and a photo-electric cell 64, which detects the presence of a bird, such as the bird 66, and in response thereto produces an actuation signal for the pneumatic cylinder 58 at a moment at which the detected bird 66 has reached the position 52. The schematically shown stop 68 ensures correct prepositioning of the bird, and the ram 56 then pushes this bird out of the plane of the track 50. In this way the wings of the bird come free from those of the adjacent bird. A second guide 70 handles the repositioning of the bird.

FIG. 4 shows schematically another solution. The poultry 82 hanging from the conveyor track indicated schematically by the line 80 is here already turned through a specific angle relative to the plane of the track and is being conveyed in the direction of the arrows 84. A first guide wheel 88 rotating in the direction of the arrow 86, whose outer periphery extends close up to the vertical plane of the track 80, presses the birds, such as the bird 82a, in the direction of the arrow 90 out of the plane of the track and when this bird subsequently reaches the position indicated by 82b a second rotary guide wheel 94 driven in the direction of the arrow 92 presses the bird again in the direction of the arrow 96 back towards the plane of the track 80. In this way entangled wings are released from each other with simple means, but in an effective manner. Finally, a fourth solution must be mentioned, which involves subjecting the hooks to turning through a large angle, for example 60°: here the wings come entirely free from each other, and after the subsequent turning back are completely free from each other.

Of course, the turning of the suspension part of the suspension hooks relative to the normal direction can be achieved in various ways. FIGS. 5 to 8 show an embodiment of a suspension hook which is particularly suitable for use in a weighing device of the type shown in FIG. 1, i.e. a hook which is raised while running into the weighing station and during its movement through the weighing station rests on supporting rollers. These supporting rollers 24a and 24b are mounted—see FIGS. 5–8—on the ends of a shaft 11 which is designed with a bore 13 which is at right angles to the axis, and through which the supporting rod 15 goes, said supporting rod being firmly connected by one end to the suspension part 17 and at the other, threaded end bears a locking nut 19. This supporting rod 15 also has a boss 21 projecting at right angles, the function of which will be explained in greater detail below. Around the shaft 11 is a forked supporting piece 23, with the projecting carrier 25 which is connected to the bar 6 of the conveyor track 2 (see FIG. 1). This forked supporting piece 23 is closed at one side by a closing plate 27 in which a guide track 29 is formed. When the part 25 takes up the position indicated by solid lines in FIG. 5 the boss 21 is in the lowest part 29a of the guide track 29 which crosses the shaft 11 at right angles, and the hook is in the position indicated in FIGS. 1 and 5, in which the plane of the hook coincides with a vertical plane through the conveyor track. If, however, the part 25 is turned through 90 degrees to the position 25a shown by dotted lines in FIG. 5—which is the case (see FIG. 1) when the supporting rollers 24a, 24b are raised in the run-up part 28—the boss 21 comes to rest in the top part of the guide track 29 running off at an angle to the right and crossing the shaft 11 at an angle of 45° (the position according to FIG. 6), and the supporting rod 15 with the suspension part 17 is hereby turned out of this plane through an angle which is determined by the shape of the guide track and can be, for example, 45° (a value which is, of course, only given by way of example). This achieves the envisaged effect: turning of the hook into the weighing position.

What is claimed is:

1. A method of weighing poultry, comprising the steps of:
    conveying a plurality of birds toward a weighing station, the birds being closely adjacent to each other, the birds being suspended by their legs from suspension hooks, the suspension hooks being suspended from a conveyor suspension track;
    disentangling the wings of the birds and separating the birds from each other, the step of disentangling the wings and separating the birds from each other including turning the birds; and
    then, while the wings of the birds are disentangled and while the birds are separated from each other, weighing the birds at the weighing station.

2. The method of claim 1, wherein the step of disentangling the wings and separating the birds from each other further includes individually displacing the birds in a horizontal direction at right angles to the conveyor suspension track.

3. The method of claim 2, wherein the step of displacing the birds occurs prior to the step of turning the birds.

4. The method of claim 2, wherein the step of displacing the birds in a horizontal direction occurs during the step of turning the birds.

5. The method of claim 2, wherein the step of displacing the birds includes operating a controlled ram.

6. The method of claim 2, wherein the step of displacing the birds includes operating a pair of oppositely rotating guide wheels.

7. The method of claim 2, wherein the step of disentangling the wings and separating the birds from each other includes displacing the birds with respect to each other in the vertical direction.

8. The method of claim 7, wherein the step of turning the birds occurs during the step of displacing the birds in the vertical direction.

9. The method of claim 8, wherein the step of displacing the birds in the vertical direction includes conveying the suspension hooks along an angled portion of the conveyor suspension track.

* * * * *